No. 894,232. PATENTED JULY 28, 1908.
W. J. RICHARDS.
MOTOR CONTROLLING SYSTEM.
APPLICATION FILED SEPT. 29, 1906.
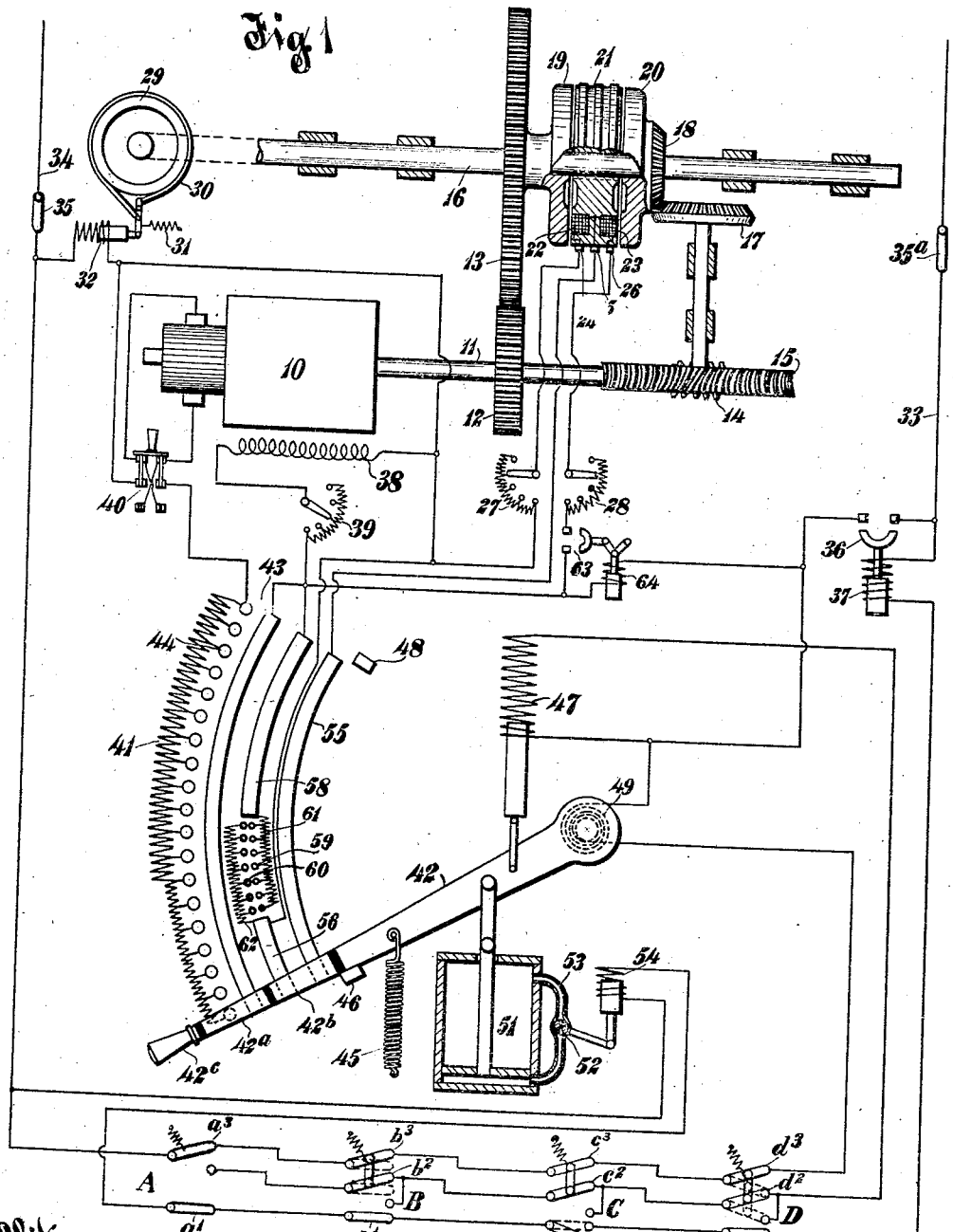
Witnesses
Oliver W. Thurman
Fred J. Kinsey
Inventor
Walter J. Richards
By
Chas. E. Lord
Attorney

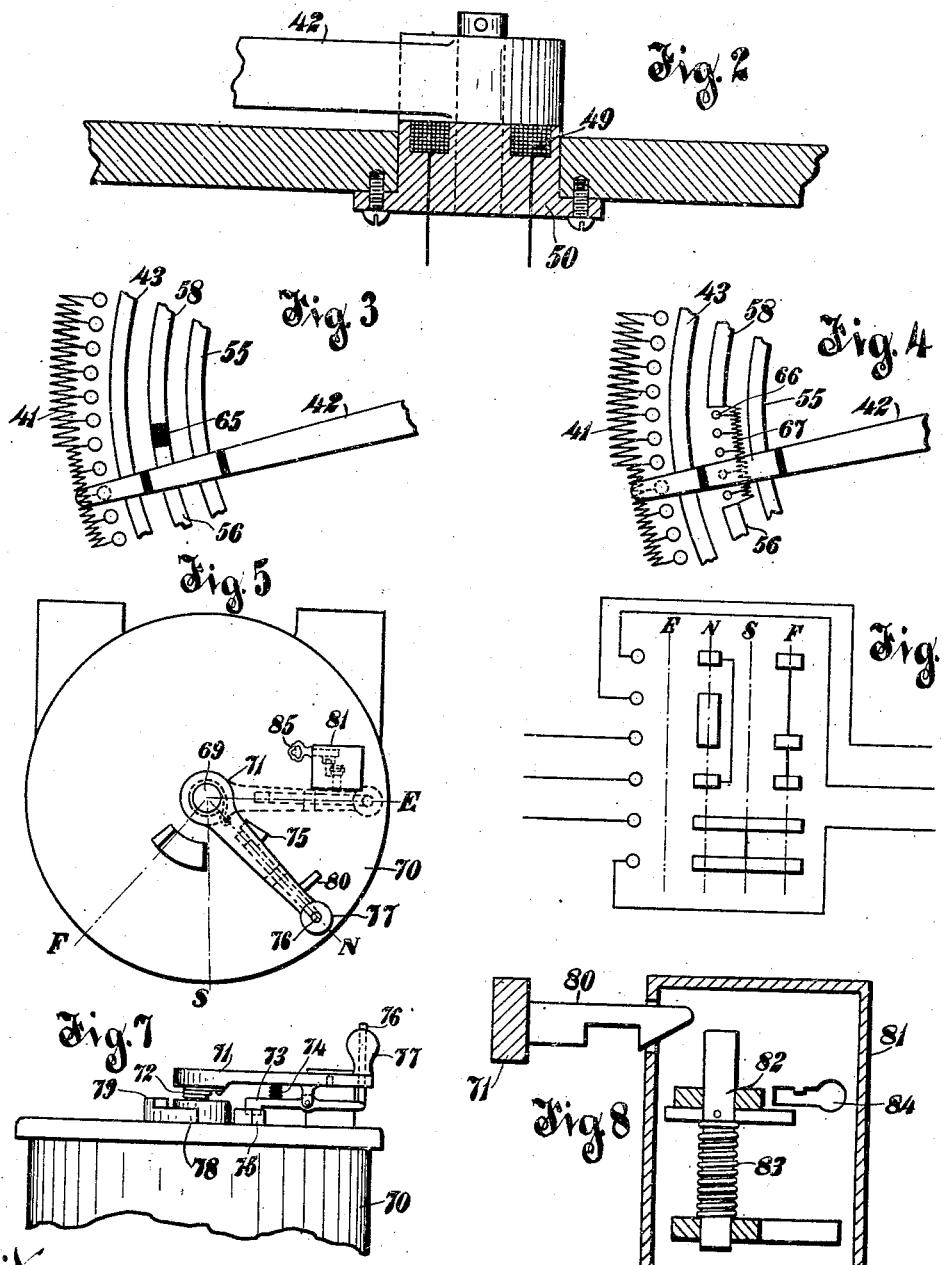

UNITED STATES PATENT OFFICE.

WALTER J. RICHARDS, OF NORWOOD, OHIO, ASSIGNOR TO ALLIS-CHALMERS COMPANY, A CORPORATION OF NEW JERSEY.

MOTOR-CONTROLLING SYSTEM.

No. 894,232.      Specification of Letters Patent.      Patented July 28, 1908.

Application filed September 29, 1906. Serial No. 336,664.

*To all whom it may concern:*

Be it known that I, WALTER J. RICHARDS, a citizen of the United States, residing at Norwood, in the county of Hamilton and State of Ohio, have invented certain new and useful Improvements in Motor-Controlling Systems, of which the following is a full, clear, and exact specification.

My invention relates to motor control systems, especially as applied to printing presses.

In operating perfecting printing presses it is necessary that the press be started and stopped without shock and it is often desirable that the press be controllable from a number of different points about it. It is also desirable that in case of a conflict of opinion between two or more of the operators, the one desiring conservative running of the press should prevail; that is, in case different operators wish to go faster, to go slower, and to stop respectively, the one desiring to stop should control as against those desiring to go faster or slower, while the one desiring to go slower should be able to do so regardless of the one desiring to go faster. Also, when it is desired to stop the press, a quick stop should be obtainable without shock. Moreover it is often necessary for an operator to inspect or repair some interior part of the driven mechanism and in such cases it is advantageous for such operator to be able to render it impossible for any one else to start the machinery. These are among the results intended to be obtained by my invention.

In one aspect my invention comprises the method of varying the speed of a driven machine, which consists in first varying the speed of its driving motor, then varying the speed of said driving motor oppositely and simultaneously inversely varying the ratio of the speed of the machine to that of its driving motor, and finally again varying the speed of said driving motor in the same manner as at first.

In another aspect my invention comprises the combination of a motor, mechanism driven thereby, and a plurality of magnetic clutches for connecting the motor and the driven mechanism together to run at different relative speeds.

In still another aspect my invention comprises the combination of a motor, mechanism driven thereby, and a single arm arranged to be moved to control both the motor speed and the relative speed of the motor and the driven mechanism.

Viewed in another way my invention consists of a controller provided with a lock for holding it in "off" position, and removable means for releasing said lock.

From still another point of view my invention comprises the combination of a motor, a main controller therefor, a plurality of master controllers for the main controller and connections whereby in case more than one master controller is operated at a time that master controller which is moved to obtain most conservative running of the motor will prevail.

Many other features of my invention will appear from the following description and the accompanying drawings and will be particularly pointed out in the claims.

Figure 1 is a diagrammatic view showing one embodiment of my invention; Fig. 2 is a sectional view showing the means for retaining the controller arm in any desired position; Figs. 3 and 4 are views showing modifications of the clutch-controlling part of the controller; Fig. 5 is a plan view of a drum-type master-controller to be used in place of the push-button stations of Fig. 1; Fig. 6 is a development of the drum of the controller of Fig. 5 showing the electrical connections; Fig. 7 is a partial elevation of the controller of Fig. 5; and Fig. 8 is an enlarged sectional view of the locking mechanism for the controller of Fig. 5. Fig. 9 shows a modified arrangement of connections for the controlling stations.

Referring first to Fig. 1, a motor 10 is mounted on a shaft 11, which carries also a pinion 12 and a worm 14. The pinion 12 meshes with a gear 13 loosely mounted on shaft 16 while the worm 14 drives the gear 15 and through it the beveled gears 17 and 18. The gears 13 and 18 are integral with or firmly attached to disks 19 and 20 respectively, which are the armatures of a double magnetic clutch. The middle part 21 only of this magnetic clutch is keyed to the shaft 16. The shaft 16 may be the driving shaft of any desired mechanism and is especially intended in this case to be the driving shaft of a perfecting printing press, though my invention is not limited to such use. The member 21 of the clutch carries two energizing coils 22 and 23 having a common terminal connected to the slip ring 25 and separate terminals connected to the slip rings 24 and 26 respectively. Rheostats 27 and 28 in series with the coils 22 and 23 respectively may be used to adjust their strength. According as one coil or the other of the magnetic clutch is energized the motor 10 drives the shaft 16 through the high speed gearing 12 and 13 or through the low speed gearing 14, 15, 17 and 18. On the shaft 16 is a brake wheel 29 with which coöperates a brake-band 30. This brake-band is normally held in operative position, as by a spring 31, but is moved to release the wheel 29 by a solenoid 32 in the motor circuit.

The motor circuit is supplied by the mains 33 and 34. If desired manual switches 35 and $35^a$ may be inserted in these mains. The motor circuit is primarily controlled by a normally open solenoid switch 36, the solenoid 37 of which is connected between the mains 33 and 34 and is controlled by the switches $a'$, $b'$, $c'$ and $d'$, all in series therewith and with each other. These switches are placed at different stations A, B, C and D around the press or other controlled mechanism. There may be any number of stations, which are the master controllers. When any one of the switches $a'$, $b'$, $c'$ and $d'$ is open the solenoid 37 is deënergized. When all of these switches are closed the solenoid 37 closes the motor circuit at switch 36. The motor field coil 38 and its controlling rheostat 39 are connected in series across the line. In the armature circuit of the motor is a reversing switch 40 and a variable resistance 41. The lower part of the resistance 41 is of comparatively fine wire while the upper part thereof is of coarser wire for a reason to be hereinafter explained. The amount of the resistance 41 in series in the motor circuit is controlled by an arm 42, the outer section $42^a$ of which connects the contact ring 43 to one of the contacts 44 of the resistance 41. A spring 45 assists gravity to bring the arm 42 to its lowermost position against the stop 46, while a solenoid 47 when energized tends to move the arm 42 upward against the stop 48. If desired a handle $42^c$ may be provided to allow manual operation of the arm 42. A coil 49 is wound in the support 50 of the arm 42 and when energized acts as a magnetic clutch to hold the arm 42 in any position in which it may happen to be. This structure is best indicated in Fig. 2. A dash-pot 51 is arranged to retard both the upward and downward movement of the arm 42 unless the valve 52 in a by-pass 53 connecting the spaces on opposite sides of the dash-pot piston is open. This valve is normally open as indicated, but may be closed by a solenoid 54 in the circuit which includes the solenoid 37.

At the stations A, B, C and D are switches $a^3$, $b^3$, $c^3$ and $d^3$ respectively, and also, except at A, switches $b^2$, $c^2$ and $d^2$ respectively. The switches $b^2$ and $b^3$, $c^2$ and $c^3$, and $d^2$ and $d^3$ are mechanically connected to move together and are biased to the positions in which they are shown in full lines. When the switches $a^3$, $b^3$, $c^3$, and $d^3$ are in their normal positions, and the main switch 36 is closed, the circuit of the coil 49 is complete and said coil holds the arm 42 in whatever position it may happen to be. When any switch $a^3$, $b^3$, $c^3$ or $d^3$ is moved into its lowest position, as shown in dotted lines at station D, the coil 49 is deënergized and, except in certain cases hereinafter described, the solenoid 47 is energized, thus causing the arm 42 to move upward. When any switch $a^3$, $b^3$, $c^3$ and $d^3$ is in its middle position, as indicated in dotted lines at station B, both the coil 49 and the solenoid 47 are deënergized and the spring 45 moves the arm 42 downward.

A second section $42^b$ of arm 42 connects the ring 55 either to the segment 56, the segment 58, or the contact buttons 59 and 60. The contact buttons 59 are connected to various points on a resistance 61, one end of which is connected to the segment 58. The contact buttons 60 are connected to points on a resistance 62, one end of which is connected to the segment 56. The segment 55 is connected to the slip ring 25, common to the two coils of the magnetic clutch; the segment 56 is connected to the slip ring 24 through the rheostat 27 and is also connected to the negative main 34; the segment 58 is connected to the slip ring 26 through the rheostat 28 and the solenoid switch 63, and is also connected to the positive main 33 through the switch 36. The switch 63 is normally open, but is arranged to be closed by a solenoid 64 in the main motor circuit.

The operation of the system is as follows:— The main line switches 35 and $35^a$ being closed, the motor 10 is started when the last of the switches $a'$, $b'$, $c'$ and $d'$ is closed. The closure of this switch, as $c'$, energizes the solenoids 37 and 54 to close the switch 36 and the valve 52 respectively. The closure of the switch 36 completes the motor circuit through the entire resistance 41, thus causing the energization of the solenoid 32 to release brake 30 and of solenoid 64 to close switch 63. While the arm 42 remains in its lowest position the clutch winding 23 is fully energized, but the clutch winding 22 is short-circuited by the section $42^b$ of arm 42.

Because of the energization of the clutch winding 23, motor 10 drives the shaft and its connected mechanism through the slow speed gearing 14 and 15 and consequently starts up with a comparatively light load. If it is desired to go faster, one of the switches $a^3$, $b^3$, $c^3$ or $d^3$ is moved into its lowest position, as shown in dotted lines at station D, and deënergizes retaining coil 49 and energizes solenoid 47. The latter begins to move the arm 42 slowly upward, gradually cutting out the lower part of the resistance 41. The arm 42 will continue its upward movement only so long as the switch $d^3$ or its analogue is held in its lowest position. Upon the release of the switch $d^3$ by the operator this switch returns to its normal or uppermost position, and deënergizes solenoid 47 and energizes retaining coil 49 to hold the arm 42 in whatever position it has reached. As the arm 42 moves upward and cuts out resistance 41 it soon leaves segment 56, and engages with the contact buttons 59 and 60. As it moves over the contact buttons 60 the resistance 62 is inserted in the shunt about clutch coil 22 and said coil is gradually energized, while the resistance 59 is first connected in shunt to the clutch coil 23 and then gradually reduced so that clutch coil 23 is gradually deënergized. When the arm 42 reaches segment 58 the clutch coil 23 is entirely short-circuited, while the shunt around coil 22 is opened. Thus the connection between the motor 10 and the shaft 16 is gradually changed from the low speed connection 14 and 15 to the high speed connection 12 and 13. As this change is being made it is necessary that the middle part 21 of the magnetic clutch slip relatively to both the parts 19 and 20, but this slip relative to the part 20 is gradually increased to the maximum while that relative to the part 19 is gradually decreased to zero. As this change from the low speed connection to the high speed connection takes place the load on the motor is thereby increased, and a greater current is taken by the motor. It is for this reason that the upper part of the resistance 41 is made of larger wire than the lower part so that it may be able to carry this heavier current. Moreover, the upper part of the resistance 41 and the armature resistance of motor 10 are so proportioned that because of the greater current required by the motor the drop in voltage in the resistance 41 is increased and the motor 10 is slowed down to such an extent that although the gear connection between the motor 10 and shaft 16 is changed from the low speed to the high speed, yet this is done without suddenly increasing the speed of shaft 16 or, if desired, without increasing it at all, thus avoiding a shock to the driven mechanism.

After the arm 42 has reached segment 58 a further movement of the arm merely cuts out more of the resistance 41 and again increases the speed of the motor 10 to correspondingly increase the speed of the press or other driven mechanism. If desired, the rheostat 39 may be combined with the rheostat 41 so that both of them are under the control of the movable arm 42, thus allowing the motor to be speeded up both by reason of a decrease in its armature resistance and a decrease in its field strength. This, however, is so obvious that I have not deemed it necessary to show it.

When the arm 42 is moved downward, the reverse of the actions above described takes place, and the motor 10 is first slowed down with the high speed connection between it and the shaft 16, then speeded up while the connection between it and the shaft 16 is changed from the high speed to the low speed, and again slowed down while the low speed clutch is operative. The above is the slowing down operation under normal conditions, but if an emergency switch, as $c'$, is opened, coils 37, 47, 49, 54, 64 and 32 are all deënergized, the motor circuit is broken at switch 36, the valve 52 is opened to allow the arm 42 to descend rapidly, the circuit of the low speed clutch winding 23 is broken at switch 63 so that there will be no sudden connection of the motor to the driven shaft through this clutch to cause a shock, the brake-band 30 is applied to the wheel 29 by the spring 31 to bring the driven parts to a standstill, and the armature 10, running as a generator armature, excites its own field 38 to brake itself somewhat. If desired the armature terminals of the motor may be connected together through a resistance to increase the braking effect.

The arrangement of switches at the various stations, A, B, C and D is such that if there is a conflict of opinion between different operators as to the proper thing to be done, the one who desires an immediate stop may obtain it by opening his emergency switch $a'$, $b'$, $c'$ or $d'$, as the case may be, and so by opening the switch 36 deprive all the operating circuits of current, so that it matters not whether any of the other operators have moved their switches for faster or slower movement. If different operators respectively desire to go faster and slower, the one who desires to go slower, say at station B, will prevail, because by moving his switches $b^2$ and $b^3$ to their intermediate positions, as shown in dotted lines, he not only interrupts the circuit of the retaining coil 49 to allow the arm 42 to descend, but also renders it impossible for the circuit of solenoid 47 to be completed at any of the other stations A, C and D. If two or more operators desire to go slower and move their switches, say $b^3$ and $d^3$, to intermediate positions, the circuit of coil 49 will be broken and additional breaks made in the circuit of coil 47, and the arm 42 will descend to cause a slowing down. If a number of operators should all desire to go faster and move their switches, say $b^3$ and $d^3$, to their lowest positions, as indicated at station D in dotted lines, the circuit of coil 49 will be broken at two points, and the circuit of coil 47 will be completed through the switches $d^2$ and $b^3$ in their lowest positions and $c^2$ and $a^3$ in their uppermost positions. Thus the arm 42 will move upward to cause a speeding up of the press. By disconnecting the lower buttons with which the switches $b^2$, $c^2$ and $d^2$ respectively may engage, as shown in Fig. 9 for one station C, the system will be such that when a plurality of operators simultaneously desire to go faster and so move their switches, say $b^3$ and $d^3$ to lowest position, none of them will be successful, for the circuits of both coil 49 and solenoid 47 will be interrupted by the movement of the two switches. This latter arrangement may be considered an advantage, because often when a number of operators simultaneously desire that the machine go faster there is some excitement about the plant and it may be desirable that a faster movement should not be obtained save when all the operators are in accord and allow one of their number to move the proper controlling switch. Thus it is seen that with my invention, conservative running of the press is favored, while control may be obtained from any desired number of points.

Fig. 3 is different from the corresponding parts shown in Fig. 1, in that the two segments 56 and 58, instead of being separated by the rows of contact buttons 59 and 60, are separated merely by a block of insulation 65. This causes the change from the low speed to the high speed clutch connection and vice versa to be sudden rather than gradual and shocks on the driven mechanism are prevented by having the coils 22 and 23 so wound that they will allow a certain amount of slippage upon a sudden jerk. This, however, while it can be arranged so that a shock is avoided, is thought not to be as desirable as the arrangement shown in Fig. 1.

In Fig. 4 the contact segments 56 and 58 are separated by a single row of contact buttons 66 connected to intermediate points on a resistance 67. The ends of this resistance are connected respectively to the contact segments 56 and 58. In this arrangement the clutch coils 22 and 23 are always shunted when at their strongest by the entire resistance 67. As the arm 42 is moved upward, the resistance 67 is gradually transferred from the shunt around the clutch coil 23 to the shunt around the clutch coil 22, thus gradually strengthening the latter clutch coil and weakening the former. This causes the change from the low speed to the high speed gearing to be gradual, as in Fig. 1, but is not as desirable as the arrangement in Fig. 1 because of the constant waste of energy in the shunt resistance 67.

In Fig. 6 is shown a development of a controller drum. A master controller such as this may be substituted for the switches at any of the stations, A, B, C and D in Fig. 1. The three wires leading out from each side of the drum in Fig. 6 are the same three wires which lead out from each side of a station, say C, in Fig. 1.

The controller drum has four positions marked E for emergency, N for normal, S for slower, and F for faster. When the drum at any station is in the emergency position E all of the circuits through that station are open, and the effect is the same as if the emergency switch, as $c'$ in Fig. 1 were open. When the controller is in position N, the circuits through that station are the same as in Fig. 1 when the switches are all closed as shown in full lines at station B. In position S of the controller, the circuit of coil 49 is interrupted and it is made impossible for the circuit of coil 47 to be completed at any other station. This corresponds to the dotted line position of station B in Fig. 1. In position F, the circuit of coil 47 is completed unless said circuit is held open at one of the other stations, corresponding to the dotted line position of station D in Fig. 1. The same conservative running of the press will occur with the controller of Fig. 6 as is desired above in connection with the master controlling switches of Fig. 1.

The controller drum of Fig. 6 is mounted on a shaft 69 in a casing 70, as shown in Figs. 5 and 7. It is operated by means of a handle 71 which is biased towards its extreme anti-clockwise position as by means of a spring 72. Pivoted beneath the arm 71 is a latch 73 which is pressed downward by a spring 74 so that by its engagement with a stop 75, it normally prohibits movement farther in an anti-clockwise direction than position N. In order to move the switch into the emergency or "off" position E, it is necessary to push a button 76 in the handle 77 on arm 71, thus raising the latch 73 so that it will clear the stop 75. It is also necessary to raise the latch 73 by means of the push button 76 when the arm is moved from the emergency stop to the normal position. The arm 71 may be moved freely from position N to position S, where the latch 73 engages with another stop 78 so that the operator can feel when he has reached this position. In order to pass position F it is necessary that the latch 73 be raised by the push button 76, whereupon a clockwise movement into such position is possible. Movement beyond position F is prohibited by an upward extension 79 on stop 78. The arm 71 will remain in either "faster" or "slower" position only so long as it is held there by the operator, for upon releasing this arm the spring 72 at once returns it to normal position.

Whenever the controller is moved into the emergency or "off" position E, a projection 80 on the arm 71 enters an aperture in a box 81 firmly attached to the cap-plate of the controller. This projection 80 has a notch in its lower surface and also has an inclined end so that when it is moved into box 81 it momentarily depresses a latch 82 normally pressed upward by a spring 83, and then allows it to spring upward into engagement with said notch. This effectively locks the arm 71 against all movement. Now in order to move the arm 71 it is necessary to unlock it and this can only be done by depressing the latch 82 by inserting the proper key 85 through the key-hole 84 in the side of the box 81. This allows an operator who wishes to inspect some internal part of the press or other driven mechanism to move one of the master controllers into the emergency stop position and then, by putting the key to that controller in his pocket, to inspect or repair any part of the driven mechanism without fear that some one through ignorance or maliciousness will start the press.

Many modifications may be made in the particular arrangements herein set forth and some parts may be used without others without departing from the spirit and scope of my invention. So in the appended claims I aim to cover broadly all its novel features.

What I claim as new is:—

1. In combination, a motor, mechanism driven thereby, a plurality of magnetic clutches for connecting the motor and the driven mechanism together to run at different relative speeds, and a controller for gradually and differently varying the strengths of the different clutch coils simultaneously.

2. In combination, a motor, mechanism driven thereby, a plurality of magnetic clutches between the motor and the driven mechanism, and means for gradually energizing one of the clutch coils and at the same time deënergizing another.

3. In combination, a motor, mechanism driven thereby, a plurality of magnetic clutches between the motor and the driven mechanism, and remotely controlled means for gradually energizing one of the clutch coils and simultaneously gradually deënergizing another.

4. In combination, a motor, mechanism driven thereby, a plurality of magnetic clutches for connecting the motor and the driven mechanism together to run at different relative speeds, and a controller for simultaneously and dissimilarly varying the strengths of the coils of said clutches.

5. In combination, a motor, mechanism driven thereby, a plurality of magnetic clutches for connecting the motor and the driven mechanism together to run at different relative speeds, and a controller for simultaneously and inversely varying the strength of two clutch coils.

6. In combination, a motor, mechanism driven thereby, a plurality of magnetic clutches for connecting the motor and the driven mechanism together to run at different relative speeds, and remotely controlled means for simultaneously and inversely varying the current strength in two clutch coils.

7. In combination, a motor, mechanism driven thereby, a plurality of magnetic clutches for connecting the motor and the driven mechanism together to run at different relative speeds, and remotely controlled means for simultaneously and inversely varying the current strength in two clutch coils and for varying the resistance in the armature circuit of the motor.

8. In combination, a motor, mechanism driven thereby, a removable resistance in the motor armature circuit, a plurality of magnetic clutches for connecting the motor and its driven mechanism to run at different relative speeds, and a controller for changing the clutch connection only while said armature resistance is in circuit.

9. In combination, a motor, mechanism driven thereby, a variable resistance in the motor armature circuit, a plurality of magnetic clutches for connecting the motor and its driven mechanism to run at different relative speeds, and a controller for varying said armature resistance and for changing the clutch connection only while some of the armature resistance is in circuit.

10. In combination, a motor, mechanism to be driven, slow-motion and fast-motion gearings between the motor and said mechanism, a clutch included in each of said gearings, and remotely controlled means for inversely varying the gripping power of said clutches.

11. In combination, a motor, mechanism driven thereby, a plurality of magnetic clutches between the motor and the driven mechanism, means for controlling the electrical connections of said clutches and the resistance in the motor armature circuit, and a plurality of master controllers for controlling said means.

12. In combination, a motor, mechanism driven thereby, a plurality of magnetic clutches between the motor and the driven mechanism, means for controlling the electrical connections of said clutches, and a plurality of master controllers for controlling said means.

13. In combination, a motor, a main controller therefor, and a master controller so connected and arranged that in different positions it can cause the main controller to move gradually to a "faster" position, to move gradually to a "slower" position, and to move rapidly to "off" position.

14. In combination, a motor, a main controller therefor, a dash-pot for retarding the movement of said controller, and a master controller for the main controller and for rendering the dash-pot ineffective.

15. In combination, a motor, a main controller therefor, a plurality of master controllers for the main controller, and connections whereby in case more than one master controller is operated at a time that master controller which is moved to obtain most conservative running of the motor will prevail.

16. In combination, a motor, a main controller for varying the speed thereof, a plurality of master controllers for the main controller, and connections whereby when any master controller is in its "off" position the other master controllers are ineffective.

17. In combination, a motor, a main controller therefor, a plurality of master controllers for the main controller, each of said master controllers having a plurality of operative positions, and connections whereby when any master controller is in certain of said operative positions the other master controllers are inoperative.

18. In combination, a motor, a main controller therefor, a plurality of master controllers for the main controller, each of said master controllers having "slower" and "faster" positions, and connections whereby when any master controller is in "slower" position, the other controllers are rendered inoperative in "faster" position.

19. In combination, a motor, a main controller therefor, a plurality of master controllers for the main controller, each of said master controllers having "slower", "faster" and "emergency stop" positions, and connections whereby when any master controller is in its "emergency stop" position, the other master controllers are rendered inoperative in "faster" and "slower" positions.

20. In combination, a motor, a main controller therefor, and a master controller for the main controller provided with "off", "normal", "slower" and "faster" positions arranged in the order named, said master controller being biased toward "off" position but provided with means for stopping it in a "normal" position.

21. In combination, a motor, a main controller therefor, a master controller for the main controller provided with "off", "normal", "slower" and "faster" positions arranged in the order named, said master controller being biased toward "off" position but provided with means for stopping it in "normal" position, and means for rendering said stopping means ineffective.

22. In combination, a motor, a main controller therefor biased toward movement in one direction, an electromagnet for moving said controller steadily in the other direction, a second electromagnet for holding the controller in any position, and a master controller for controlling said two electromagnets.

23. In combination, a motor, a main controller therefor biased to move in one direction, an electromagnet for moving said controller in the other direction, a second electromagnet for holding said controller in any position, and a master controller for energizing either of said electromagnets separately but not simultaneously or for deënergizing them both.

24. In combination, a motor, a main controller therefor biased to move in one direction, an electromagnet for moving said controller steadily in the other direction, a second electromagnet for holding said controller in any position against movement in either direction, and a plurality of master controllers each controlling both of said electromagnets.

25. In combination, a motor, a main controller therefor biased to move in one direction, an electromagnet for moving said controller in the other direction, a second electromagnet for holding said controller in any position, and a plurality of master controllers for said electromagnets, said master controllers being connected to energize either of said electromagnets separately but not together or to deënergize them both.

26. In combination, a motor, a variable resistance in the armature circuit thereof, a controller arm for varying said resistance, said controller arm being biased toward movement in one direction, an electromagnet for moving said arm in the other direction, a second electromagnet for holding said arm in any position, and a master controller for energizing either of said magnets separately but not both at once or for deënergizing them both, and for controlling the motor circuit.

27. In combination, a motor, a main controller therefor biased to move in one direction, a remotely controlled electromagnet for moving said controller uninterruptedly in the other direction, and a second remotely controlled electromagnet for holding said controller in any position.

28. In combination, a motor, a main controller therefor biased in one direction, an electromagnet for moving said controller in the other direction, a second electromagnet for holding said controller in any position, and a plurality of master controllers for said electromagnets, said master controllers being so interconnected that when one of them interrupts the circuits of both said electromagnets, the other controllers are unable to complete said circuits.

29. In combination, a motor, a controller therefor biased in one direction, an electromagnet for moving said controller steadily in the other direction, and a second electromagnet for holding said controller in any position against movement in either direction.

30. The combination with an electric motor and a starting resistance therefor, of mechanism for varying said resistance, a main switch in the motor circuit, and a plurality of master controllers for controlling both said resistance-varying mechanism and said switch, said master controllers being so interconnected that when one of them is moved to cause the opening of the main switch the others are rendered inoperative.

31. The combination with an electric motor and a starting resistance therefor, of mechanism for varying said resistance, a main switch in the motor circuit, and a plurality of master controllers for controlling both said resistance-varying mechanism and said switch, said master controllers being so interconnected that when one of them is moved to cause the starting resistance to be cut in the other controllers are ineffective to cause it to be cut out.

32. The combination with an electric motor and a starting resistance therefor, of mechanism for varying said resistance, a main switch in the motor circuit, and a plurality of master controllers for controlling both said resistance-varying mechanism and said switch, the master controllers being so interconnected that when one of them is moved to cause the starting resistance to be cut into circuit the others are ineffective save to open the main switch.

33. In combination, a motor, mechanism driven thereby, a plurality of magnetic clutches for connecting the motor and the driven mechanism together to run at different relative speeds, and a rheostat in the motor armature circuit, said rheostat having a high resistance portion which is variable when there is a slow speed connection between the motors and the driven mechanism, and a low resistance portion which is variable when there is a high speed connection between said parts.

34. In combination, a motor, mechanism to be driven thereby, a plurality of trains of gearing between the motor and the driven mechanism, a corresponding plurality of resistances in the armature circuit of the motor, said resistances having different current carrying capacities, and means for varying each of said resistances when the corresponding train of gearing is operative.

35. In combination, a motor, mechanism driven thereby, two magnetic clutches between the motor and the driven mechanism, and a resistance having two parts of different current carrying capacities, one of said parts being variable while one clutch is operative and the other while the other clutch is operative.

36. In combination, a translating device, a main controller for controlling the voltage impressed thereon, a plurality of devices for controlling said main controller, and means whereby in case more than one of said devices is operated at a time only that one which is moved to obtain the most conservative operation will be effective.

37. In combination, a translating device, a main controller for controlling the voltage impressed thereon, a plurality of devices for controlling said main controller, and means whereby when more than one of said devices is operated at the same time those which are operated to obtain the less conservative operations are ineffective.

38. In combination, a motor, mechanism to be driven, slow-motion and fast-motion gearings between the motor and said mechanism, a clutch included in each of said gearings, and unitary means for inversely varying the driving power of said clutches.

39. In combination, a motor, mechanism driven thereby, slow-motion and fast-motion gearings between the motor and said mechanism, a clutch included in each of said gearings, and remotely controlled means for gradually and inversely varying the driving power of said clutches.

40. In combination, a motor, mechanism driven thereby, slow-motion and fast-motion gearings between the motor and said mechanism, a clutch included in each of said gearings, and unitary means for gradually and inversely varying the gripping power of said clutches.

In testimony whereof I affix my signature, in the presence of two witnesses.

WALTER J. RICHARDS.

Witnesses:
GEO. B. SCHLEY,
FRED J. KINSEY.